United States Patent
Aoki et al.

(10) Patent No.: US 7,720,375 B2
(45) Date of Patent: May 18, 2010

(54) OBJECT DETECTING SYSTEM

(75) Inventors: Hiroshi Aoki, Tokyo (JP); Masato Yokoo, Tokyo (JP); Yuu Hakomori, Tokyo (JP)

(73) Assignee: Takata Corporation, Tokyo (JP)

( * ) Notice: Subject to any disclaimer, the term of this patent is extended or adjusted under 35 U.S.C. 154(b) by 433 days.

(21) Appl. No.: 11/710,520

(22) Filed: Feb. 26, 2007

(65) Prior Publication Data
US 2007/0223910 A1 Sep. 27, 2007

(30) Foreign Application Priority Data
Mar. 22, 2006 (JP) .............................. 2006-079326

(51) Int. Cl.
*G03B 7/26* (2006.01)
*G03B 41/00* (2006.01)
*G03B 19/00* (2006.01)
*H04N 7/18* (2006.01)

(52) U.S. Cl. ........................ 396/301; 396/322; 396/429; 348/148; 348/149

(58) Field of Classification Search ................. 396/301, 396/322, 325, 419, 429; 348/47, 51, 115, 348/118, 148, 159
See application file for complete search history.

(56) References Cited

U.S. PATENT DOCUMENTS

| | | | | |
|---|---|---|---|---|
| 5,414,461 A | * | 5/1995 | Kishi et al. | 348/115 |
| 5,528,698 A | | 6/1996 | Kamei et al. | |
| 6,535,242 B1 | * | 3/2003 | Strumolo et al. | 348/148 |
| 2002/0113876 A1 | | 8/2002 | Kim | |
| 2002/0126876 A1 | | 9/2002 | Paul et al. | |
| 2004/0006427 A1 | | 1/2004 | Stiller | |
| 2006/0012679 A1 | | 1/2006 | Ressler | |

FOREIGN PATENT DOCUMENTS

| | | |
|---|---|---|
| JP | 2003-294855 | 10/2003 |
| WO | WO 03/002366 A1 | 1/2003 |

* cited by examiner

*Primary Examiner*—Rochelle-Ann J Blackman
(74) *Attorney, Agent, or Firm*—Foley & Lardner LLP

(57) ABSTRACT

An object detecting system includes a plurality of photographing mechanisms that are used to detect information about objects inside and outside a vehicle. An object detecting system is installed in a vehicle and comprises a first camera and a second camera to obtain information about objects inside and outside the vehicle. They system further includes a controller for conducting controls to detect information about an object and an electrical power unit to supply electrical power from a vehicle battery to the respective cameras. At least one of the controller and the electrical power unit is shared by the first camera and the second camera.

24 Claims, 6 Drawing Sheets

OBJECT DETECTING SYSTEM

BACKGROUND

The present invention relates to an object detecting system to be installed in a vehicle and, more particularly, to a technology for detecting information about objects inside and outside a vehicle.

Conventionally, there are various known technologies for detecting information about an object occupying a vehicle seat by using a photographing mechanism, such as a camera. For example, Japanese Patent Unexamined Publication No. 2003-294855 (incorporated by reference herein in its entirety) discloses a configuration of an occupant detecting apparatus in which a single camera arranged in front of a vehicle occupant is used to detect the position of the vehicle occupant.

SUMMARY

One exemplary embodiment of the invention relates to object detecting system. The system comprises: a first photographing mechanism for photographing an object in a first area among areas inside and outside a vehicle, and a second photographing mechanism for photographing an object in a second area different from the first area among the areas inside and outside the vehicle; a control mechanism to detect information about the objects based on images of the objects taken by the respective first and second photographing mechanisms; and an electrical power mechanism which is disposed between a vehicle battery and the respective photographing mechanisms to supply electrical power from the vehicle battery to each photographing mechanism. At least one of the control mechanism and the electrical power mechanism is shared by the first photographing mechanism and the second photographing mechanism.

Another exemplary embodiment provides an actuating device. The actuating device comprises an object detecting system, a subject to be actuated, and an actuation control mechanism to control the actuation of the subject to be actuated based on information detected by the control mechanism of the object detecting system. The object detecting system includes: a first photographing mechanism for photographing an object in a first area among areas inside and outside a vehicle, and a second photographing mechanism for photographing an object in a second area different from the first area among the areas inside and outside the vehicle; a control mechanism to detect information about the objects based on images of the objects taken by the respective first and second photographing mechanisms; and an electrical power mechanism which is disposed between a vehicle battery and the respective photographing mechanisms to supply electrical power from the vehicle battery to each photographing mechanism. At least one of the control mechanism and the electrical power mechanism is shared by the first photographing mechanism and the second photographing mechanism.

Another exemplary embodiment provides a vehicle. The vehicle comprises an engine/running system, an electrical system, an actuation control device to actuate the engine/running system and the electrical system, a vehicle battery, and an object detecting mechanism for detecting information about a plurality of objects in areas inside and outside a vehicle. The object detecting mechanism comprises an object detecting system that includes: a first camera for photographing an object in a first area among areas inside and outside a vehicle, and a second camera for photographing an object in a second area different from the first area among the areas inside and outside the vehicle; a control mechanism to detect information about the objects based on images of the objects taken by the respective first and second cameras; and an electrical power mechanism which is disposed between the vehicle battery and the respective cameras to supply electrical power from the vehicle battery to each camera. At least one of the control mechanism and the electrical power mechanism is shared by the first camera and the second camera.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
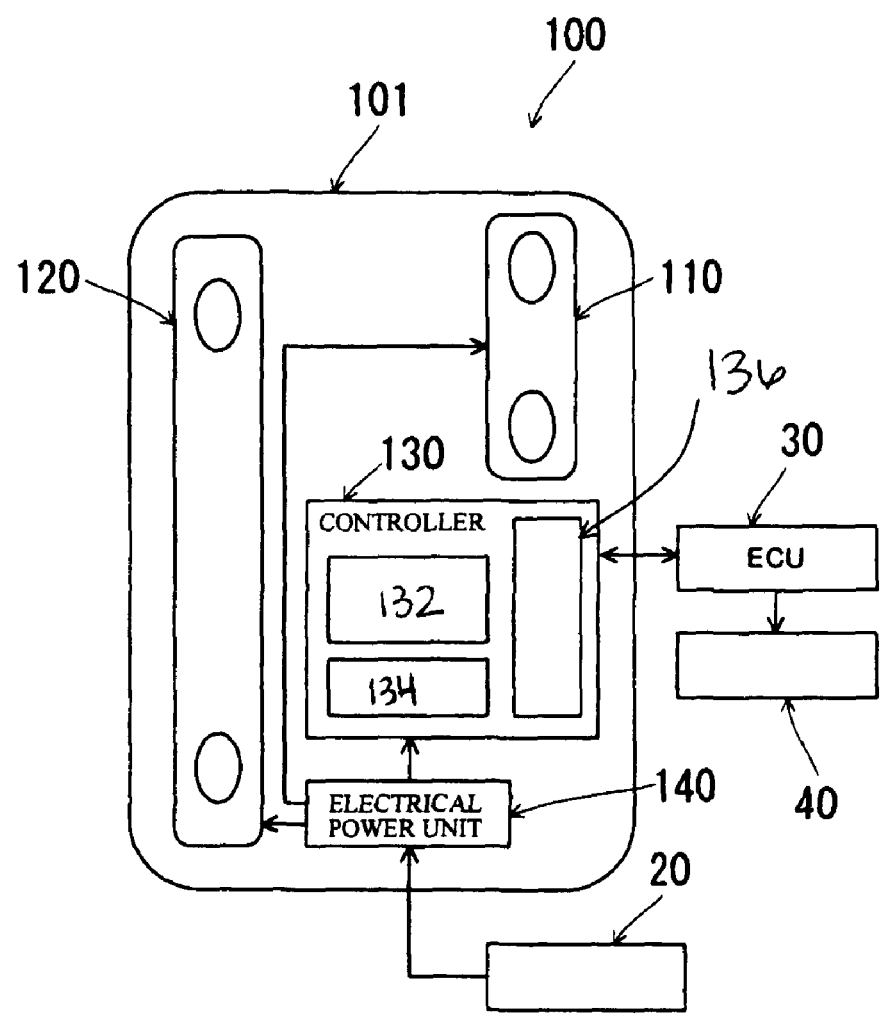
FIG. 1 is an illustration showing an object detecting system according to an embodiment which is installed in a vehicle.

The technology of photographing an object in and around a vehicle by using a photographing mechanism, such as a camera, in the vehicle like the aforementioned occupant detecting apparatus disclosed in JP Pub. No. 2003-294855 can be effective for detecting information about the object. As for the object detecting technology of this kind, however, it is required to develop a system for reasonably detecting information about objects inside and outside the vehicle by using a plurality of photographing mechanisms.

An object of the present invention is to provide a technology effective for rationalizing an object detecting system in which a plurality of photographing mechanisms are used to detect information about objects inside and outside a vehicle.

An object detecting system is typically adapted for an automobile for detecting information about objects inside and outside the vehicle (automobile), embodiments can be also adapted to a technology for developing an object detecting system in a vehicle other than the automobile, such as airplane, boat, train, bus, and the like.

An object detecting system of a first embodiment comprises at least a first photographing mechanism and a second photographing mechanism, a control mechanism, and an electrical power mechanism. In the present embodiment, another photographing mechanism may be provided in addition to the first photographing mechanism and the second photographing mechanism.

The first photographing mechanism of this embodiment is a mechanism for photographing an object in a first area among respective areas inside and outside of a vehicle. The second photographing mechanism of this embodiment is a mechanism for photographing an object in a second area different from the first area. Both the first area and the second area may be areas inside the vehicle or areas outside the vehicle. Alternatively, the first area may be an area inside the vehicle and the second area may be an area outside the vehicle, or the first area may be an area outside the vehicle and the second area may be an area inside the vehicle. As these photographing mechanisms, 3-D type pantoscopic cameras, 3-D type monocular cameras, or 2-D type cameras may be employed.

The control mechanism is a mechanism for conducting controls to detect information about the objects based on images of the objects taken by the respective photographing mechanism. Specifically, the control mechanism comprises at least an image processing mechanism, a storing mechanism, and an input/output mechanism.

The image processing mechanism has a function of controlling the respective photographing mechanism to obtain good quality images and of controlling the image processing for processing images taken by the photographing mechanism to be used for analysis. As for the control of the photographing mechanism, the frame rate, the shutter speed, the sensitivity setting, and the accuracy are corrected and the dynamic range, the brightness, and the white balance are adjusted. As for the control of the image processing, the spin compensation for image, the correction for distortion of the lens, the filtering operation, and the difference operation as image preprocessing operations are conducted and the configuration determination and the trucking as image recognition processing operations are conducted. In the image processing mechanism, the parallax operation is conducted in case of using a 3-D type pantoscopic, while the time lag operation is conducted in case of a 3-D type monocular camera. The functions of the image processing mechanism further include distance correcting operation, range gate operation, stereo grouping operation, object recognition operation such as motion vector operation in which the object is tracked, and determination operation for outputting control signals.

The storing mechanism is a mechanism for storing (recording) data for correction, buffer frame memory for preprocessing, defined data for recognition operation, and reference patterns as well as an operation control software.

The input/output mechanism inputs information about the vehicle, information about traffic conditions around the vehicle, information about weather condition and about time zone, and the like to the ECU for conducting controls of the entire vehicle and outputs recognition results. As the information about the vehicle, there are, for example, the state (open or closed) of a vehicle door, the wearing state of the seat belt, the operation of brakes, the vehicle speed, and the steering angle.

The electrical power mechanism is disposed between a vehicle battery and the respective photographing mechanism to supply electric power from the vehicle battery to at least the respective photographing mechanism. That is, the electrical power mechanism is connected to the vehicle battery and has a function as a voltage converting unit so that the electrical power mechanism supplies electrical power of the vehicle battery to the respective photographing mechanism after converting the voltage of the electrical power of the vehicle battery. Therefore, the electrical power mechanism is assumed as an actual power source for the object detecting system. The electrical power mechanism preferably functions as the power source for the control mechanism as well as the respective photographing mechanism.

In this embodiment, at least one of the control mechanism and the electrical power mechanism is shared by the first photographing mechanism and the second photographing mechanism. As for the "sharing" used here, an aspect in which one of the control mechanism and the electrical power mechanism is shared or an aspect in which both the control mechanism and the electrical power mechanism are shared may be employed. Typically, an arrangement in which controls for the first photographing mechanism and the second photographing mechanism are conducted by the same control mechanism and/or an arrangement in which power is supplied to the first photographing mechanism and the second photographing mechanism from the same electrical power mechanism may be employed. Moreover, an arrangement in which controls for one or more photographing mechanism in addition to the first photographing mechanism and the second photographing mechanism are conducted by the same control mechanism and/or an arrangement in which power is supplied to one or more photographing mechanism in addition to the first photographing mechanism and the second photographing mechanism may be employed.

Since the control mechanism is a relatively expensive component having relatively high heating value among respective components of the object detecting system, the sharing of the control mechanism can reduce the cost and the entire size of the system without deteriorating the capacity of the system. In addition, the electrical power mechanism is an important part for determining capacity of electronic system of the photographing mechanism. Therefore, the sharing of the electrical power unit is substantially equal to the designing the first photographing mechanism and the second photographing mechanism to be included in a single system, thereby reducing the entire size of the system and effectively achieving electrical power saving.

Therefore, according to the first embodiment, particularly at least one of the control mechanism and the electrical power mechanism is shared by the first photographing mechanism and the second photographing mechanism, thereby rationalizing the object detecting system.

An object detecting system of a second embodiment has the same or similar structure of the first embodiment and has a structure that the electrical power mechanism is shared by the first photographing mechanism and the second photographing mechanism of which timings of using the maximum current are different from each other. In addition, the timing of supply of the maximum current supplied from the electrical power mechanism to the first photographing mechanism is different from the timing of supply of the maximum current supplied from the electrical power mechanism to the second photographing mechanism.

According to the aforementioned structure, the electrical power mechanism is shared and the timings of supply of the maximum current (peak current) from the electrical power mechanism to the first photographing mechanism and the second photographing mechanism are staggered from each other, thereby restricting the maximum supply current of the electrical power mechanism and thus making efficient use of the power source. This can allow the use of the electrical power mechanism of a smaller size, thereby also reducing the size of the entire object detecting system.

An object detecting system of a third embodiment has the same or similar structure of the first or second embodiment and has a structure that the control mechanism is shared by the first photographing mechanism and the second photographing mechanism. In addition, the control mechanism varies the occupancy rates of object detecting capacity by the respective photographing mechanism based on at least one of information about the detected object(s) and information about the vehicle. The "information about the detected object" used here includes, as information inside the vehicle: information about motion of a vehicle occupant when getting on or off the vehicle; and information about the body size of the vehicle occupant and, as information outside the vehicle: information about presence or absence of a leading vehicle; a vehicle in the next lane; a bicycle; a pedestrian; and an obstacle; and information of vehicle speed of a leading vehicle or a vehicle in the next lane. The "information about the vehicle" used here includes information whether the vehicle runs or not, information about vehicle speed, information about the state (open or closed) of a vehicle door, and information about the wearing state of the seat belt. The information about the object and the information about the vehicle are effective for suitably determining how share the occupancy of the object detecting capacity between the first photographing mechanism and the second photographing mechanism.

Therefore, according to the aforementioned structure, the occupancy rate of the object detecting capacity occupied by the respective photographing mechanism is variable based on at least one of the information about the detected object and the information about the vehicle, thereby further rationalizing the object detecting system.

An object detecting system of a fourth embodiment has the same or similar structure as the third embodiment and has a structure that the first photographing mechanism forms a viewing field toward an area inside the vehicle as the first area and the second photographing mechanism forms a viewing field toward an area outside the vehicle as the second area.

In the object detecting system of this embodiment, the control mechanism sets a first setting mode in which the occupancy rate of the object detecting capacity occupied by the first photographing mechanism is higher than that by the second photographing mechanism when the vehicle is stopped. That is, in the first setting mode, a larger part of the object detecting capacity is assigned to the photographing mechanism which photographs the inside of the vehicle than the photographing mechanism which photographs the outside of the vehicle according to the information that the vehicle is stopped (stopping or idling of the engine). This is based on the idea that the need for detection of information outside the vehicle is low when the vehicle is stopped. Since it is not necessarily fast update images of the outside of the vehicle by the second photographing mechanism, this allows improvement in quality of images of the inside of the vehicle so that it is reasonable. The sharing ratios may be suitably set as needed while a larger part of the object detecting capacity is assigned to the photographing mechanism which photographs the inside of the vehicle than the photographing mechanism which photographs the outside of the vehicle.

On the other hand, the control mechanism sets a second setting mode in which the occupancy rate by the second photographing mechanism is higher than that in the first setting mode when the vehicle is running. That is, in the second setting mode, the object detecting capacity assigned to the photographing mechanism which photographs the outside of the vehicle is higher than that in the first setting mode according to the information that the vehicle is running. This is based on the idea that the need for detection of information outside the vehicle becomes higher than that when the first setting mode is set. This allows improvement in quality of images of the outside of the vehicle by the second photographing mechanism so that it is reasonable. As the object detecting capacity assigned to the photographing mechanism which photographs the outside of the vehicle is increased, the sharing ratios are suitably varied as needed. For example, the second setting mode includes a case that a larger part of the object detecting capacity is assigned to the photographing mechanism which photographs the inside of the vehicle than the photographing mechanism which photographs the outside of the vehicle and a case that a larger part of the object detecting capacity is assigned to the photographing mechanism which photographs the outside of the vehicle than the photographing mechanism which photographs the inside of the vehicle.

Therefore, according to the fourth embodiment, the timings of requiring the image processing with the maximum capacity can be staggered between the two photographing mechanism having different purposes of utilization, that is, for photographing the inside and the outside of the vehicle, thereby achieving the sharing of the control mechanism without deterioration in object detecting capacity.

In this embodiment, in addition to the first setting mode and the second setting mode by the control mechanism as mentioned above, another setting mode may be provided. For example, a setting mode may be provided in which a larger part of the object detecting capacity is assigned to the photographing mechanism which photographs the outside of the vehicle than the photographing mechanism which photographs the inside of the vehicle based on information that the possibility of collision with an object outside the vehicle becomes higher. In addition, a setting mode may be provided in which a larger part of the object detecting capacity is assigned to the photographing mechanism which photographs the inside of the vehicle than the photographing mechanism which photographs the outside of the vehicle based on information that the collision with the object outside the vehicle is unavoidable. As a result of photographing of the inside of the vehicle precisely and detecting the position and the motion of the occupant at a high speed, a collision prevention device or a collision impact reduction device which is actuated to prevent a vehicle collision or to reduce the collision impact by mechanism of an alarm and/or brakes and an occupant restraining mechanism for restraining an occupant such as an airbag and a seat belt can be suitably actuated according to the state of the occupant.

An object detecting system of a fifth embodiment has the same or similar structure as the third embodiment and has a structure that the first photographing mechanism forms a viewing field toward an area including a driver seat inside the vehicle as the first area and the second photographing mechanism forms a viewing field toward an area including a front passenger seat inside the vehicle as the second area.

In the object detecting system of this embodiment, the control mechanism sets a first setting mode in which the occupancy rate of the object detecting capacity occupied by the first photographing mechanism is higher than that by the second photographing mechanism when the motion of an occupant of the driver seat is larger than that of an occupant of the front passenger seat. That is, in the first setting mode, a larger part of the object detecting capacity is assigned to the photographing mechanism which photographs the driver seat than the photographing mechanism which photographs the front passenger seat according to the information that the motion of the occupant of the driver seat is larger than that of the occupant of the front passenger seat. This is based on the idea that the need for precise detection of the occupant on the driver seat of which motion is larger than the occupant of the front passenger seat is higher. For example, as for the motion of the occupant when getting on and off the vehicle or changing his posture during normal driving, the motion of an occupant of the driver seat and the motion of an occupant of the front passenger seat are compared to each other to determine which motion is large or small. Since it is not necessarily fast update images of the occupant of the first passenger seat by the second photographing mechanism, this allows improvement in quality of images of the occupant of the driver seat by the first photographing mechanism so that it is reasonable. The sharing ratios may be suitably set as needed while a larger part of the object detecting capacity is assigned to the photographing mechanism which photographs the driver seat than the photographing mechanism which photographs the front passenger seat.

On the other hand, the control mechanism sets a second setting mode in which the occupancy rate of the object detecting capacity occupied by the second photographing mechanism is higher than that by the first photographing mechanism when the motion of the occupant of the front passenger seat is larger than that of the occupant of the driver seat. That is, in the second setting mode, a larger part of the object detecting capacity is assigned to the photographing mechanism which photographs the front passenger seat than the photographing mechanism which photographs the driver seat according to the information that the motion of the occupant of the front passenger seat is larger than that of the occupant of the driver seat. This is based on the idea that the need for precise detection of the occupant on the front passenger seat of which motion is larger than the occupant of the driver seat is higher. Since it is not necessarily fast update images of the occupant of the driver seat by the first photographing mechanism, this allows improvement in quality of images of the occupant of the driver seat by the second photographing mechanism so that it is reasonable. The sharing ratios may be suitably set as needed while a larger part of the object detecting capacity is assigned to the photographing mechanism which photographs the front passenger seat than the photographing mechanism which photographs the driver seat.

Therefore, according to the fifth embodiment, the timings of requiring the image processing with the maximum capacity can be staggered between the two photographing mechanism having different purposes of utilization, that is, for photographing the driver seat and the front passenger seat, thereby achieving the sharing of the control mechanism without deterioration in object detecting capacity.

In this embodiment, in addition to the first setting mode and the second setting mode by the control mechanism as mentioned above, another setting mode may be provided. For example, the reliabilities of detection are calculated from results of photographing the occupant of the driver seat and the results of photographing the occupant of the front passenger seat. Depending on the reliabilities of detection, a larger part of the object detecting capacity is assigned to the photographing mechanism which photographs the occupant of which reliability of detection is smaller. This control mode achieves the improvement in accuracy of detection of the occupant of which reliability is smaller.

In an object detecting system of the sixth embodiment, the first photographing mechanism and the second photographing mechanism (which may be the same or similar to any of the preceding embodiments) each comprise a 3-D camera capable of detecting a three-dimensional profile (three-dimensional surface profile) of respective object. According to this structure, by using a 3-D camera capable of measuring the distances relative to respective object a plurality of times, the precise recognition of the object is achieved. In case that the distances relative to the object are measured by using a pantoscopic camera as the 3-D camera, the sharing of the control mechanism by the first photographing mechanism and the second photographing mechanism can provide significant advantage because the volume of parallax operation by the control mechanism (image processing mechanism) is great. In case that the distances relative to the object are measured by using a monocular camera as the 3-D camera, the sharing of the electrical power mechanism by the first photographing mechanism and the second photographing mechanism can provide significant advantage by controlling the electrical power to be as constant as possible by changing the operation timing of an illuminator between the respective photographing mechanism because the power consumption of the illuminator is large. This can prevent occurrence of noise and reduce the size of the electrical power mechanism.

An object detecting system of a seventh embodiment has the same structure as any of the preceding embodiments and has a structure that a housing section for accommodating the first photographing mechanism and a housing section for accommodating the second photographing mechanism are composed of a single casing. This arrangement achieves a single unit structure in which at least the first photographing mechanism and the second photographing mechanism are accommodated in a single casing, thereby achieving the reduction in entire size of the system.

It should be noted that the present embodiment includes an arrangement that the first photographing mechanism, the second photographing mechanism, the control mechanism, and the electrical power mechanism are all accommodated in a single casing and an arrangement that the first photographing mechanism and the second photographing mechanism are accommodated in a first casing and the control mechanism and the electrical power mechanism are accommodated in a second casing separate from the first casing.

An object detecting system of an eighth embodiment has the same structure as the seventh embodiment and is structured as a single unit in which the control mechanism and the electrical power mechanism are also accommodated in the single casing accommodating the first photographing mechanism and the second photographing mechanism. This arrangement achieves a single unit structure in which, in addition to the first photographing mechanism and the second photographing mechanism, the control mechanism and the electrical power mechanism are accommodated in the single casing, thereby achieving further reduction in entire size of the object detecting system.

An object detecting system of a ninth embodiment has the same structure as the eighth embodiment and has a structure that the single unit is mounted to an area around a side mirror or an area around an inner rearview mirror among respective components of the vehicle. As the area around the side mirror, for example, a door frame panel to which the side mirror is mounted may be selected. As the area around the inner rearview mirror, for example, an illumination unit of a center console may be selected. The area around the side mirror and the area around the inner rearview mirror are effective in ensuring viewing field toward the inside and the outside of the vehicle, especially effective in forming a wide viewing field toward occupant(s) inside the vehicle. Therefore, the object detecting system as a single unit structure is mounted to the area around the side mirror or the area around the inner rearview mirror, thereby achieving a rational setup of the object detecting system.

An actuating device of a tenth embodiment comprises: at least an object detecting system of any of the preceding embodiments; a subject to be actuated; and an actuation control mechanism. The subject to be actuated includes a collision prevention device or a collision impact reduction device which is actuated to prevent a vehicle collision or to reduce the collision impact by an alarm and/or brakes, an occupant restraining mechanism for restraining an occupant such as an airbag and a seat belt, and the like. The actuation control mechanism of this embodiment is a mechanism for controlling the actuation of the subject to be actuated based on information detected by the control mechanism of the object detecting system.

According to this structure, the subject to be actuated is controlled to be actuated in a suitable manner corresponding to the results of detection of objects by the control mechanism of the object detecting system, thereby enabling detailed control for the subject to be actuated.

A vehicle of an eleventh embodiments comprises: an engine/running system; an electrical system; an actuation control device; a vehicle battery; and an object detecting mechanism. The engine/running system is a system involving an engine and a running mechanism of the vehicle. The electrical system is a system involving electrical parts used in the vehicle. The actuation control device is a mechanism having a function of conducting the actuation control of the engine/running system and the electrical system. The object detecting mechanism is a mechanism for detecting information about a plurality of objects in areas inside and outside the vehicle. In this embodiment, the object detecting mechanism comprises an object detecting system of any of the first through ninth embodiments.

According to this structure, there is provided a vehicle mounted with an object detecting system which is rationalized.

As described in the above, the present embodiment relates to an object detecting system for detecting information about objects inside and outside the vehicle by using a first photographing mechanism and a second photographing mechanism. The object detecting system comprises the first photographing mechanism and the second photographing mechanism, a control mechanism for conducting controls to detect information about the objects, and an electrical power mechanism for supplying electric power from the vehicle battery to the respective photographing mechanism. In the object detecting system, particularly at least one of the control mechanism and the electrical power mechanism is shared by the first photographing mechanism and the second photographing mechanism, thereby rationalizing the object detecting system.

Hereinafter, description will be made as regard to embodiments of the present invention with reference to drawings. First, an object detecting system 100 according to an embodiment will be described with reference to FIG. 1 through FIG. 3.

The structure of the object detecting system 100, which is installed in a vehicle, of this embodiment is shown in FIG. 1.

As shown in FIG. 1, the object detecting system 100 of this embodiment comprises a single casing 101 in which at least a first camera 110, a second camera 120, a controller 130, and an electrical power unit 140 are accommodated and thus united. That is, in this embodiment, two housing portions for accommodating the cameras respectively are composed of the single casing 101. The single casing 101 corresponds to the "single casing" of the present invention.

Each of the first camera 110 and the second camera 120 of this embodiment is a 3-D (three-dimensional) camera (sometimes called "monitor") of a C-MOS or CCD (charge-coupled device) type in which light sensors are arranged into an array (lattice) arrangement. In this embodiment, a 3-D type pantoscopic camera (sometimes called "3-D camera") capable of detecting a three-dimensional profile (three-dimensional surface profile) of an object by measuring distances relative to the object a plurality of times is employed as each of the cameras. Further, each camera has a structure including a photographing device (projector lens and the like) and a data transfer circuit. It should be noted that a 3-D type monocular camera may be employed instead of the 3-D type pantoscopic camera. The first camera 110 is disposed to face the inside of the vehicle, thereby photographing an image of an object on a front or rear seat such as a vehicle occupant seated in the front or rear seat, a child seat or a junior seat attached to the front or rear seat, and a baggage put on the front or rear seat, but details will be described later. On the other hand, the second camera 120 is disposed to face an area outside the vehicle, thereby photographing an image of an object such as a pedestrian, a bicycle, another vehicle, and an obstacle.

The controller 130 of this embodiment comprises an image processing mechanism (computing mechanism) 132, a storing mechanism 134, an input/output mechanism 136, and the like. In this embodiment, this controller 130 is shared by the first camera 110 and the second camera 120.

The image processing mechanism is a mechanism for controlling the camera to obtain good quality images and for controlling the image processing for processing images taken by the camera to be used for analysis. Specifically, as for the control of the camera, the frame rate, the shutter speed, the sensitivity setting, and the accuracy are corrected and the dynamic range, the brightness, and the white balance are adjusted. As for the control of the image processing, the spin compensation for image, the correction for distortion of the lens, the filtering operation, and the difference operation as image preprocessing operations are conducted and the configuration determination and the trucking as image recognition processing operations are conducted. In the image processing mechanism, the parallax operation is conducted in case of using a 3-D type pantoscopic camera just like this embodiment, while the time lag operation is conducted in case of using a 3-D type monocular camera. The functions of the image processing mechanism further include distance correcting operation, range gate operation, stereo grouping operation, object recognition operation such as motion vector operation in which the object is tracked, and determination operation for outputting control signals. In the image processing mechanism, some or all of the aforementioned operations can be shared by the first camera 110 and the second camera 120 and the occupancy ratios of the respective operations are variable. For example, in case that the parallax operation and/or the image preprocessing operations are shared, the occupancy ratio thereof can be changed by allocating the frame rate of frames. In case that the recognition operation is shared, the occupancy ratio thereof can be changed by allocating the recognition level, the accuracy, and the calculating time.

In the image processing mechanism of this embodiment, the occupancy ratios (SF) of the object detecting capacity occupied by the first camera 110 and the second camera 120 are changed based on information about the vehicle (for example, information whether the vehicle runs or not, information about vehicle speed, information about the state (open or closed) of a vehicle door, and information about the wearing state of the seat belt) and information about object (for example, information about motion of a vehicle occupant when getting on or off the vehicle, and information about the body size of the vehicle occupant), but details will be described later.

The storing mechanism of the controller 130 is a mechanism for storing (recording) data for correction, buffer frame memory for preprocessing, defined data for recognition operation, and reference patterns a well as an operation control software.

The input/output mechanism of the controller 130 inputs information about the vehicle, information about traffic conditions around the vehicle, information about weather condition and about time zone, and the like to the ECU 30 for conducting controls of the entire vehicle and outputs recognition results. As the information about the vehicle, there are, for example, the state (open or closed) of a vehicle door, the wearing state of the seat belt, the operation of brakes, the vehicle speed, and the steering angle. In this embodiment, based on the information outputted from the input/output mechanism, the ECU 30 outputs actuation control signals to a subject 40 to be actuated. As the subject 40 to be actuated, there is, for example, a collision prevention device or a collision impact reduction device which is actuated to prevent a vehicle collision or to reduce the collision impact by mechanism of an alarm and/or brakes and an occupant restraining mechanism for restraining an occupant such as an airbag and a seat belt.

The electrical power unit 140 of this embodiment is disposed between a vehicle battery 20 and the first camera 110 and the second camera 120 to supply electrical power for driving to the first camera 110, the second camera 120, and the controller 130. In this embodiment, the electrical power unit 140 is adapted to be shared by the first camera 110 and the second camera 120. The electrical power unit 140 is connected to the vehicle battery 20 and has a function as a voltage converting unit so that the electrical power unit 140 supplies electrical power of the vehicle battery 20 to the first camera 110, the second camera 120, and the controller 130 after converting the voltage of the electrical power of the vehicle battery 20. Therefore, the electrical power unit 140 is an actual power source for the object detecting system 100.

In this embodiment, the timings of using the maximum current of the first camera 110 and the second camera 120 are staggered from each other so that the electrical power unit 140 is shared by the first camera 110 and the second camera 120. The timing of supplying maximum current from the electrical power unit 140 to the respective camera varies between the first camera 110 and the second camera 120. According to this structure, the electrical power unit 140 is shared and the timings of using the maximum current (peak current) from the electrical power unit to the first camera 110 and the second camera 120 are staggered from each other, thereby restricting the maximum supply current of the electrical power unit 140 and thus making efficient use of the power source. This can allow the use of the electrical power unit 140 of a smaller size, thereby also reducing the size of the entire object detecting system.

Figure 2:
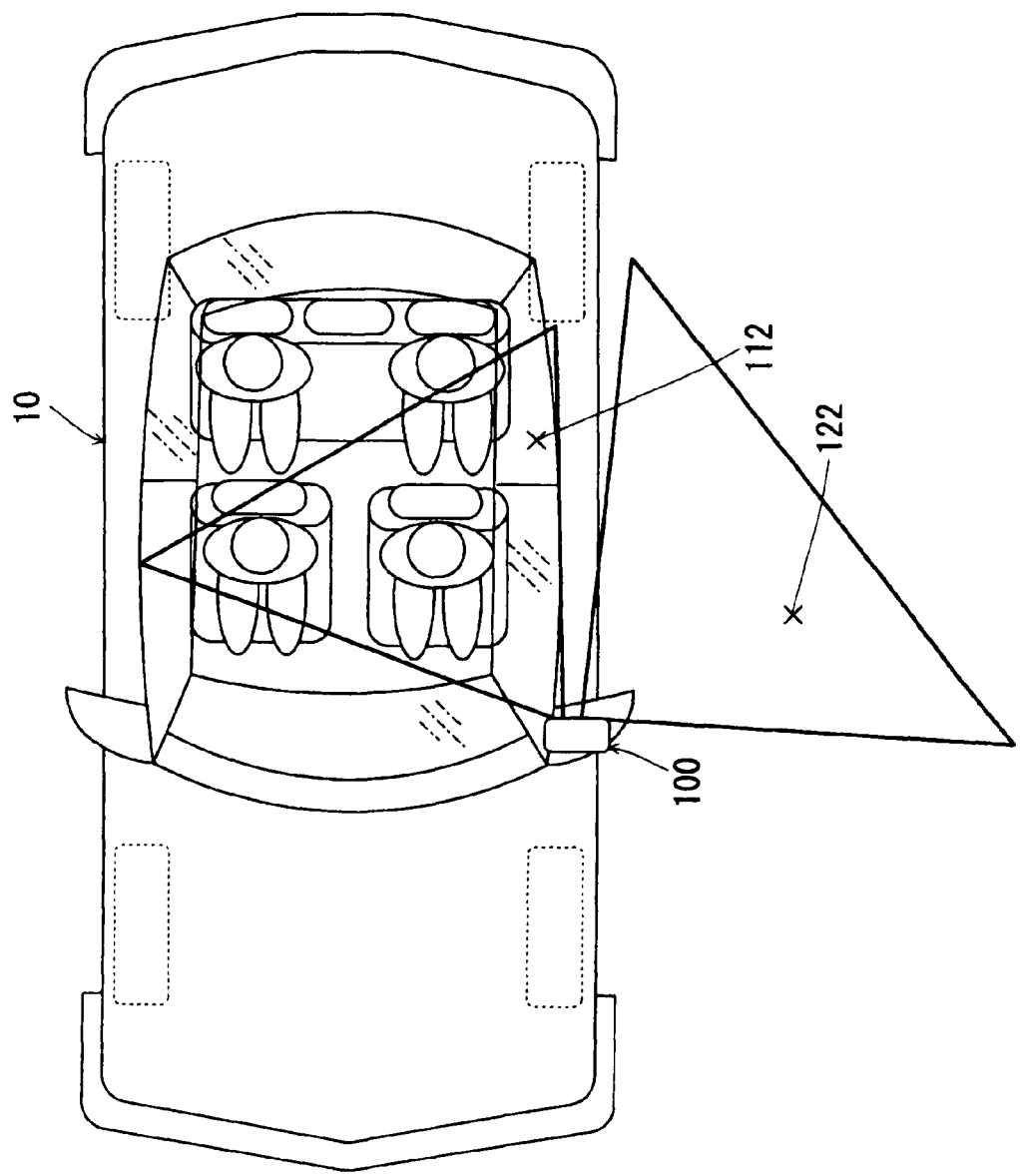
FIG. 2 is an illustration, taken from above a vehicle, showing a first arrangement aspect of the object detecting system according to this embodiment.
Figure 3:
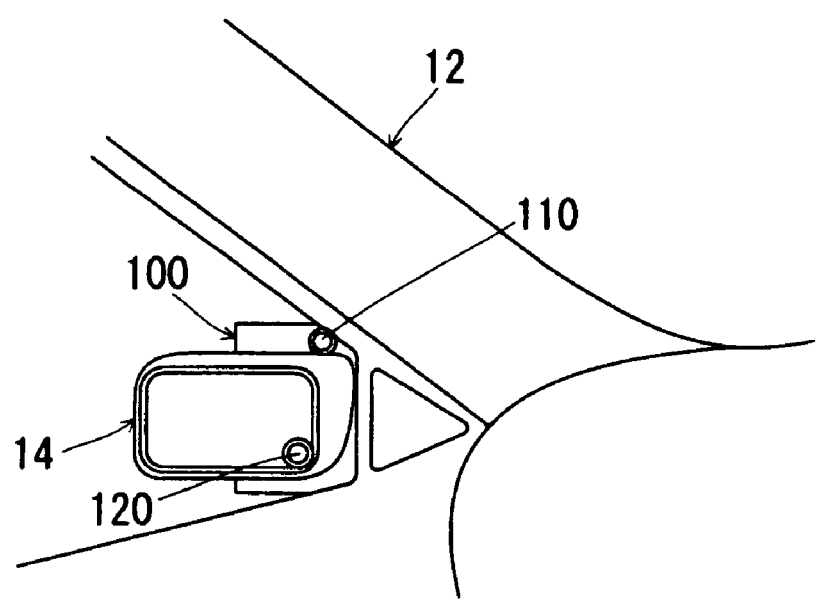
FIG. 3 is an illustration, taken from the inside of the vehicle, showing an area around a side mirror of the vehicle in the first arrangement aspect of the object detecting system.

FIG. 2 and FIG. 3 show a specific form of arrangement of the object detecting system 100 having the aforementioned structure. FIG. 2 is an illustration, taken from above a vehicle 10, showing a first arrangement aspect of the object detecting system 100 according to this embodiment and FIG. 3 is an illustration, taken from the inside of the vehicle, showing an area around a side mirror 14 of the vehicle 10 in the first arrangement aspect of the object detecting system 100.

As shown in FIG. 2 and FIG. 3, the object detecting system 100 of this embodiment can be disposed in an area around a side mirror (sometimes called "door mirror") among respective components of the vehicle 10 i.e. an automobile as the "vehicle" of the present invention. Specifically, the object detecting system 100 as a single unit is assembled into a door frame panel to which the side mirror 14 is mounted. This section is a boundary between an A-pillar 12 and the door frame panel.

Though the object detecting system 100 is disposed around the side mirror 14 on the left side of the vehicle in FIG. 2, the object detecting system 100 may be disposed around a side mirror 14 on the right side of the vehicle or side mirrors 14 on the both sides of the vehicle.

According to the object detecting system 100 disposed according to the first arrangement aspect, a viewing field 112 toward the inside of the vehicle is formed by the first camera 110. This viewing field 112 is a wide viewing field (for example, a viewing field of which the field of view ("FOV") is about 120 degrees) covering a driver seat, front passenger seat, and the entire of a rear seat (rear seats). Therefore, the front seats (the driver seat, the front passenger seat) and the rear seats can be photographed, thereby detecting information, such as size, configuration, position, presence or absence, and kind, of vehicle occupant, child seat, and baggage on the seats. On the other hand, a viewing field 122 (for example, a viewing field of which FOV is about 60 degrees) toward a side area outside the vehicle is formed by the second camera 120. Therefore, information, such as size, configuration, position, presence or absence, and kind, of pedestrian, bicycle, another vehicle (overtaking vehicle), and obstacle lateral to the vehicle can be detected. For example, detection of a blind spot, possibility of a lateral collision, and occurrence of a lateral collision can be checked by the second camera 120. The second camera 120 may be disposed to form a viewing field 122 toward a front area outside the vehicle.

Figure 6:
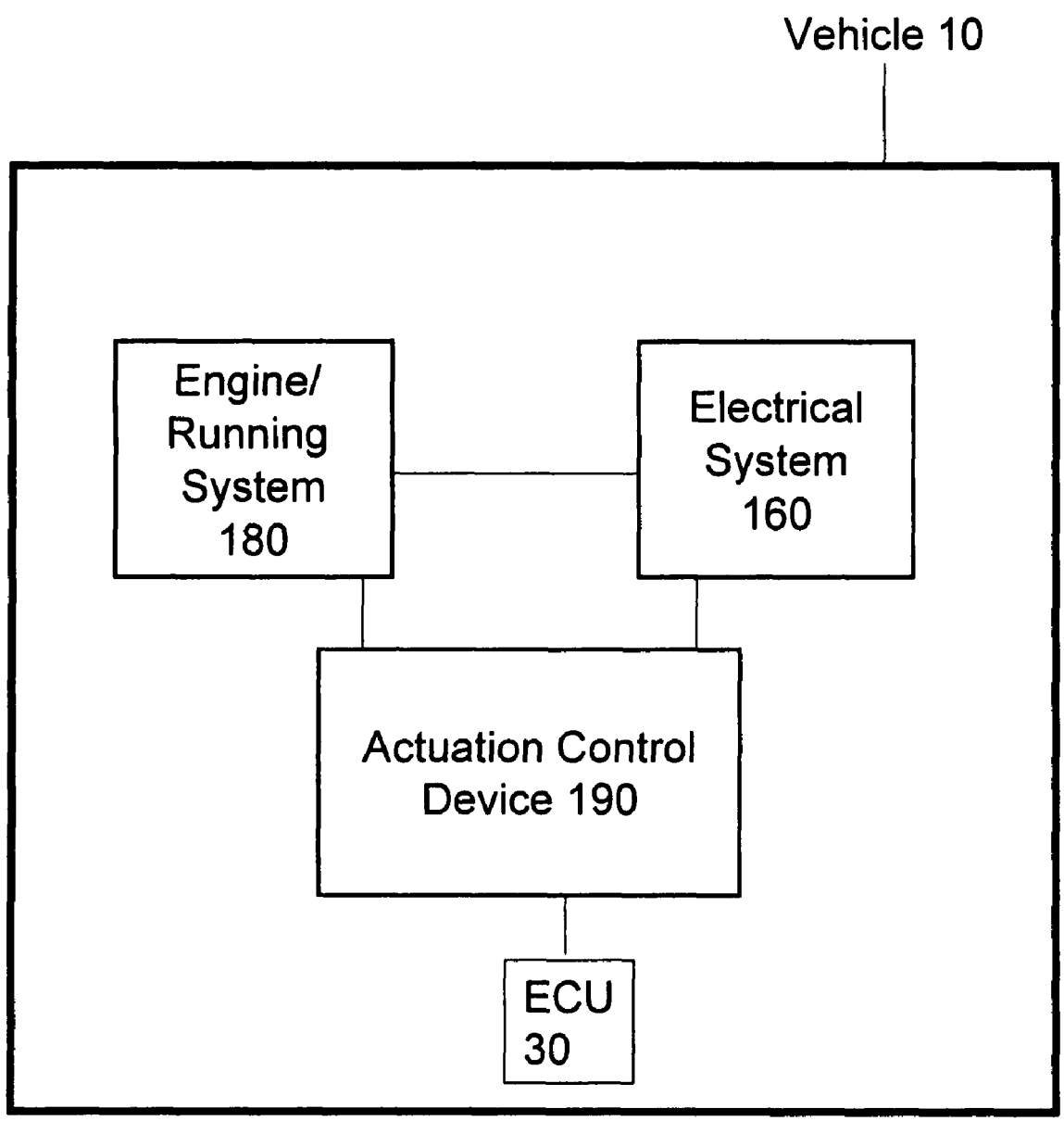
FIG. 6 is an illustration showing components of a vehicle according to an embodiment.

The vehicle 10 comprises, such as shown in FIG. 6, an engine/running system 180 involving an engine and a running mechanism of the vehicle, an electrical system 160 involving electrical parts used in the vehicle, and an actuation control device 190 for conducting the actuation control of the engine/running system and the electrical system, and a processing mechanism (the aforementioned ECU 30) which makes the actuation control device process information obtained by the first camera 110 and the second camera 120.

Figure 4:
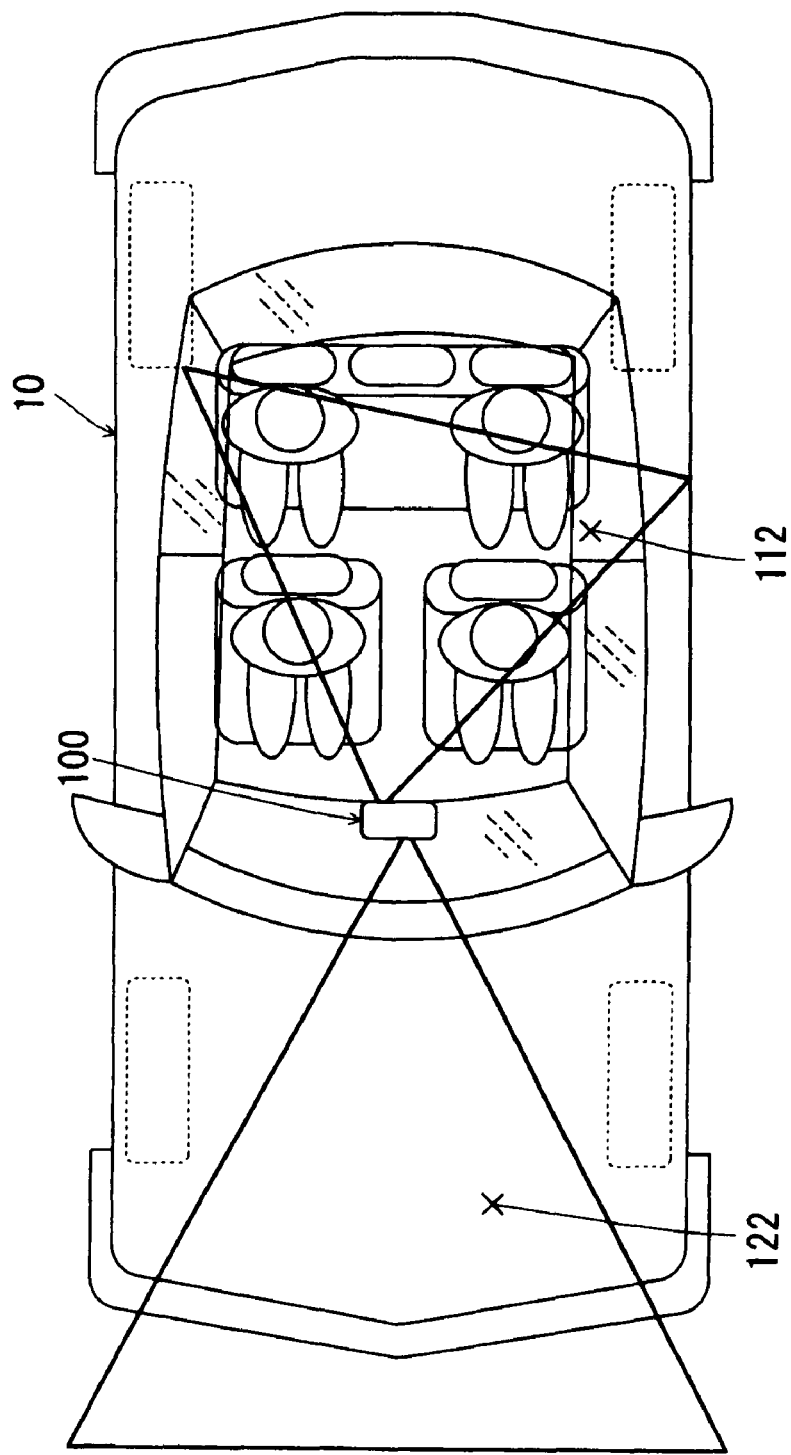
FIG. 4 is an illustration, taken from above a vehicle, showing a second arrangement aspect of the object detecting system according to this embodiment.
Figure 5:
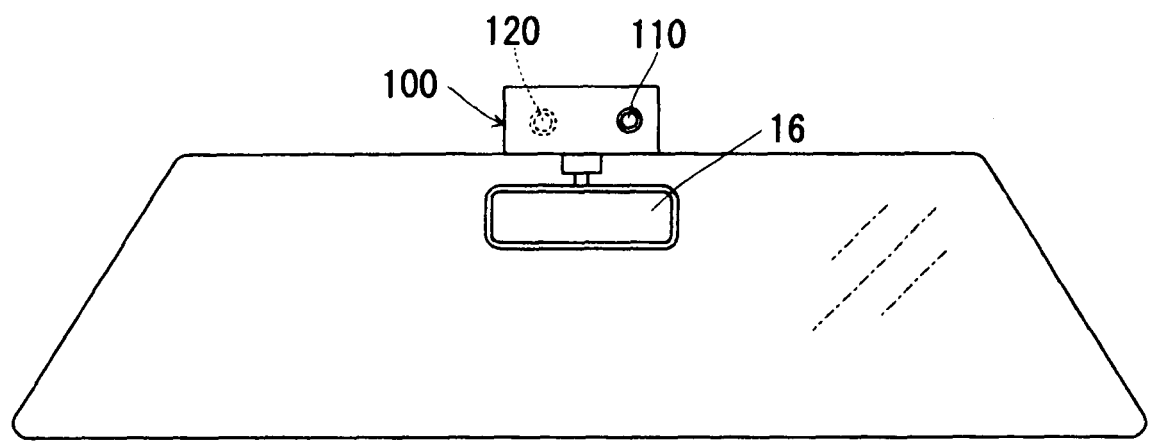
FIG. 5 is an illustration, taken from the inside of the vehicle, showing an area around an inner rearview mirror of the vehicle in the second arrangement aspect of the object detecting system of this embodiment.

As for the specific arrangement aspect of the object detecting system 100 having the aforementioned structure, an arrangement aspect different from the arrangement aspect shown in FIG. 2 and FIG. 3 is shown FIG. 4 and FIG. 5. FIG. 4 is an illustration, taken from above a vehicle 10, showing a second arrangement aspect of the object detecting system 100 according to this embodiment and FIG. 5 is an illustration, taken from the inside of the vehicle, showing an area around an inner rearview mirror 16 of the vehicle 10 in the second arrangement aspect of the object detecting system 100 of this embodiment.

As shown in FIG. 4 and FIG. 5, the object detecting system 100 of this embodiment can be disposed in an area around the inner rearview mirror 16 among respective components of the vehicle 10. Specifically, the object detecting system 100 as a single unit is assembled into an illumination unit of a center console. This section is in an area around the inner rearview mirror 16 and a boundary between an upper portion of a front windshield and a front portion of a ceiling panel.

In the object detecting system 100 disposed according to the second arrangement aspect, a viewing field 112 toward the inside of the vehicle is formed by the first camera 110. This viewing field 112 is a wide viewing field (for example, a viewing field of which FOV is about 120 degrees) capable of providing balanced overall view of a driver seat, front passenger seat, and the entire of a rear seat (rear seats). Therefore, the front seats (the driver seat, the front passenger seat) and the rear seats can be photographed, thereby detecting information, such as size, configuration, position, presence or absence, and kind, of vehicle occupant, child seat, and baggage on the seats. On the other hand, a viewing field 122 (for example, a viewing field of which FOV is about 60 degrees) toward a front area outside the vehicle is formed by the second camera 120. Therefore, information, such as size, configuration, position, presence or absence, and kind, of pedestrian, bicycle, another vehicle (leading vehicle, oncoming vehicle), and obstacle in front of the vehicle can be detected. For example, the movement of a leading vehicle, an interruption of an oncoming vehicle into a lane on which the own vehicle runs, possibility of a front collision, and occurrence of a front collision can be checked by the second camera 120. The second camera 120 may be disposed to form a viewing field 122 toward a side area outside the vehicle.

Hereinafter, the operation of the aforementioned object detecting system 100 will be described.

As an ignition key of the vehicle 10 is turned on, the electrical power unit 140 operates to actuate the first camera 110 and the second camera 120.

In this embodiment, the operations by the image processing mechanism of the controller 130 are shared as mentioned above, and the occupancy rates of the respective operations (actually, the object detecting capacity occupied by the respective cameras) are variable based on the information about the vehicle (for example, information whether the vehicle runs or not, information about vehicle speed, information about the state (open or closed) of a vehicle door, and information about the wearing state of the seat belt) and information about object (for example, information about motion of a vehicle occupant when getting on or off the vehicle, and information about the body size of the vehicle occupant). As one example, it is assumed that the occupancy rate (SF) relating to the operations for the second camera 120 is controlled in the following four setting modes. The occupancy rate of the object detecting capacity occupied by the second camera 120 is set in a range of from 0% to 30% in a first mode (L mode), is set in a range of from 30% to 60% in a second mode (M mode), is set in a range of from 60% to 90% in a third mode (H mode), and is set in a range of from 90% to 100% in a fourth mode (F mode).

At the start of the vehicle 10, when an occupant is getting in or out of the vehicle 10, or when the occupant puts on the seat belt (latches a buckle), the occupancy rate by the second camera 120 is set to the first mode (L mode). Since the need for detection of information outside the vehicle is extremely low in this case, the accuracy of detection by the second camera 120 is set to be the lowest (the detection cycle (frame rate) of the camera is set to be the lowest), while the accuracy of vehicle occupant detection by the first camera 110 is set to be the highest (the detection cycle (frame rate) of the camera is set to be the highest), thereby increasing the degree of reliability of detection of the state of vehicle occupant(s).

When the vehicle 10 is stopped or running at a low speed, the occupancy rate by the second camera 120 is set to the second mode (M mode) in the absence of a moving object in front of the vehicle. Since the need for detection of information outside the vehicle is equal to or lower than the need for detection of information inside the vehicle, the accuracy of detection by the second camera 120 is set to be relatively low (the detection cycle (frame rate) of the camera is set to be relatively low), while the accuracy of vehicle occupant detection by the first camera 110 is set to be relatively high (the detection cycle (frame rate) of the camera is set to be relatively high).

When the vehicle 10 is running at a middle or high speed, the occupancy rate by the second camera 120 is set to the third mode (H mode). Since the need for detection of information outside the vehicle is higher than the need for detection of information inside the vehicle, the accuracy of detection by the second camera 120 is set to be relatively high, while the accuracy of vehicle occupant detection by the first camera 110 is set to be relatively low. It should be noted that, when the vehicle is running at a constant speed on a straight lane and there is no leading vehicle even when the vehicle is running at a middle or high speed, the occupancy rate by the second camera 120 may be set to the second mode (M mode) periodically so as to improve the accuracy of vehicle occupant detection.

The risk of collision due to a sudden stop of a leading vehicle or the risk of collision with an oncoming vehicle is evaluated periodically through the second camera 120. As it is detected that there is such a risk, an alarm is outputted to the driver and the occupancy rate by the second camera 120 is set to the fourth mode (F mode) so as to hasten the evaluation cycle or increase the accuracy of operations, thereby monitoring whether or not the risk is increasing. If the risk of collision increases, a device for preventing or reducing the vehicle collision, for example, a warning device and/or a pre-braking device is actuated and a device for restraining the occupant, for example, a seat belt device is actuated (to wind up a seat belt) according to the output of the monitoring result.

When the risk of the collision further increases and it is determined that the collision is unavoidable, a collision unavoidable signal is outputted. According to the output of the collision unavoidable signal, the occupancy rate by the second camera 120 is set to the first mode (L mode) so that the accuracy of vehicle occupant detection by the first camera 110 becomes the highest (the detection cycle (frame rate) of the camera becomes the highest). According to the output of the collision unavoidable signal, a device such as an airbag device for restraining a vehicle occupant is actuated. At the time of deployment of the airbag, the position of the vehicle occupant is detected precisely, thereby properly actuating the airbag in a manner corresponding to the detected position of the vehicle occupant. When the vehicle is stopped after the occurrence of the vehicle collision, the occupancy rate by the second camera 120 is set to the second mode (M mode) so as to allow the detection of movement of the vehicle occupant and monitoring of conditions around the vehicle.

As mentioned above, in this embodiment, the subject to be actuated 40 (such as a warning device, a pre-braking device, a seat belt device, and an airbag device) is controlled to be actuated in a suitable manner corresponding to the results of detection of objects by the controller 130, thereby enabling detailed control for the subject to be actuated 40.

In this embodiment, instead of the structure that the inside of the vehicle 10 is photographed by the first camera 110 and the outside of the vehicle is photographed by the second camera 120, a structure that the first camera 110 and the second camera 120 are both used for photographing the inside of the vehicle or the outside of the vehicle may be employed.

As an example, a structure that the first camera 110 photographs the driver seat and the second camera 120 photographs the front passenger seat is employed.

In this structure, as for the motion of the occupant when getting on and off the vehicle or changing his posture during normal driving, the motion of an occupant of the driver seat and the motion of an occupant of the front passenger seat are compared to each other to determine whether the motion is large or small. Accordingly, a larger part of the object detecting capacity is assigned to the camera which photographs the occupant of which motion is larger. For example, when it is determined that the need for precise detection of the occupant of the driver seat of which motion is larger is higher than the need for precise detection of the occupant of the front passenger seat, a larger part of the object detecting capacity is assigned to the first camera 110. Since it is not necessarily fast to update images of the occupant of the front passenger seat by the second camera 120, this allows improvement in quality of images of the occupant of the driver seat so that it is reasonable.

On the other hand, when it is determined that the need for precise detection of the occupant of the passenger seat of which movement is larger is higher than the need for precise detection of the occupant on the driver seat, a larger part of the object detecting capacity is assigned to the second camera 120. Since it is not necessarily fast to update images of the occupant of the driver seat by the first camera 110, this allows improvement in quality of images of the occupant of the front passenger seat so that it is reasonable.

When the occupant takes an irregular posture, when the occupant moves fast, or when an abnormal reflection of light is incident, the reliability of detection of the occupant may be decreased. The reliability of detection depends on noise amount in the camera, variations in detection results, continuity from past frames, and the like. Therefore, the reliabilities of detection are calculated from results of photographing the occupant of the driver seat by the first camera 110 and the results of photographing the occupant of the front passenger seat by the second camera 120. Depending on the reliabilities of detection, a larger part of processing capability is assigned to the side of the occupant of which reliability of detection is smaller, thereby improving the accuracy of detection.

As mentioned above, according to the object detecting system 100 of this embodiment, the controller 130 and the electrical power unit 140 are both shared by the first camera 110 and the second camera 120, thereby rationalizing the object detecting system 100. That is, since the controller 130 is relatively expensive and has relatively high heating value among respective components of the object detecting system 100, the sharing of the controller 130 by the first camera 110 and the second camera allows reduction in cost and entire size of the system without deteriorating the capacity of the system. In addition, the electrical power unit 140 is an important part for determining capacity of electronic system of the first camera 110 and the second camera 120. Therefore, the sharing of the electrical power unit 140 by the first camera 110 and the second camera 120 is substantially equal to the designing the first camera 110 and the second camera 120 to have a single system, thereby reducing the entire size of the system and effectively achieving electrical power saving.

In the object detecting system 100 of this embodiment, the structure in which the first camera 110, the second camera 120, the controller 130, and the electrical power unit 140 are accommodated in the single casing 101 is employed, thereby reducing the entire size of the object detecting system. According to the structure, the object detecting system as a single unit can be relatively readily attached to any selected position in the vehicle.

In this embodiment, since 3-D cameras such as the first camera 110 and the second camera 120 are used, the distances relative to respective object can be measured so that the precise recognition of the object is achieved. In case that the distances relative to the object are measured by using a pantoscopic camera as the 3-D camera, the sharing of the controller 130 by the first camera 110 and the second camera 120 provides significant advantage because the volume of parallax computation by the controller (image processing mechanism) 130 is great. In case that the distances relative to the object are measured by using a monocular camera as the 3-D camera, the sharing of the electrical power unit 140 by the first camera 110 and the second camera 120 provides significant advantage by controlling the electrical power to be as constant as possible by changing the operation timing of an illuminator between the first camera 110 and the second camera 120 because the power consumption of the illuminator is large. This can prevent occurrence of noise and reduce the size of the electrical power unit 140.

The present invention is not limited to the aforementioned embodiments and various applications and modifications may be made. For example, the following respective embodiments based on the aforementioned embodiment may be carried out.

Though the aforementioned embodiment has been described with regard to the object detecting system 100 having two cameras, i.e. the first camera 110 and the second camera 120, a plurality of cameras can be mounted in a single object detecting system in the present invention. As the plurality of cameras, 3-D type pantoscopic cameras, 3-D type monocular cameras, or 2-D type cameras may be suitably employed.

Though the aforementioned embodiment has been described with regard to the arrangement that the controller 130 and the electrical power unit 140 are both shared by the first camera 110 and the second camera 120, embodiments can employ an arrangement that at least one of the controller 130 and the electrical power unit is shared by a plurality of photographing mechanism including the first camera 110 and the second camera 120.

Though the aforementioned embodiment has been described with regard to the arrangement that the first camera 110, the second camera 120, the controller 130, and the electrical power unit 140 are accommodated in the single casing 101, embodiments can employ an arrangement that a plurality of photographing mechanism at least including the first camera 110 and the second camera 120 are accommodated in the single casing.

Though the aforementioned embodiment has been described with regard to the arrangement that the object detecting system 100 is mounted to a position around the side mirror 14 or around the inner rearview mirror 16 among respective components of the vehicle, the position to which the object detecting system 100 can be suitably selected according to need in the embodiment. For example, the object detecting system 100 may be mounted to a portion between an A-pillar and a B-pillar, a center portion in the lateral direction of a dash board, and the like. Alternatively, the first camera 110, second camera 120, and/or additional cameras can be placed and embedded in a peripheral portion of an inner rear view mirror, peripheral portions of side mirrors, the ceiling, and/or a center portion in the lateral direction of a dashboard and is arranged to face one or a plurality of passenger seats, or any other suitable location.

Though the aforementioned embodiment has been described with regard to the arrangement of the object detecting system to be installed in an automobile, the present invention can be adopted to object detecting systems to be installed in various vehicles other than automobile such as an airplane, a boat, a train, a bus, and the like.

The Japanese Priority Application 2006-079326, filed Mar. 22, 2006, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An object detecting system comprising:
    a first photographing mechanism for photographing an object in a first area, and a second photographing mechanism for photographing an object in a second area different from the first area, the first area being one of an area inside or outside the vehicle, and the second area being an area inside or outside the vehicle;

a control mechanism to detect information about the objects based on images of the objects taken by the respective first and second photographing mechanisms; and an electrical power mechanism which is disposed between a vehicle battery and the respective photographing mechanisms to supply electrical power from the vehicle battery to each photographing mechanism, wherein at least one of the control mechanism and the electrical power mechanism is shared by the first photographing mechanism and the second photographing mechanism, wherein the control mechanism is shared by the first photographing mechanism and the second photographing mechanism, and the control mechanism varies the occupancy rates of object detecting capacity by the respective photographing mechanisms based on at least one of information about the detected object(s) and information about the vehicle.

2. The object detecting system as claimed in claim 1, wherein the electrical power mechanism is shared by the first photographing mechanism and the second photographing mechanism of which timings of using a maximum current are different from each other, and the timing of supply of the maximum current supplied from the electrical power mechanism to the first photographing mechanism is different from the timing of supply of the maximum current supplied from the electrical power mechanism to the second photographing mechanism.

3. The object detecting system as claimed in claim 1, wherein the first photographing mechanism forms a viewing field toward an area inside the vehicle as the first area and the second photographing mechanism forms a viewing field toward an area outside the vehicle as the second area, and wherein the control mechanism sets a first setting mode in which the occupancy rate of the object detecting capacity occupied by the first photographing mechanism is higher than that by the second photographing mechanism when the vehicle is stopped, while the control mechanism sets a second setting mode in which the occupancy rate by the second photographing mechanism is higher than that in the first setting mode when the vehicle is running.

4. The object detecting system as claimed in claim 1, wherein the first photographing mechanism forms a viewing field toward an area including a driver seat inside the vehicle as the first area and the second photographing mechanism forms a viewing field toward an area including a front passenger seat inside the vehicle as the second area, and wherein the control mechanism sets a first setting mode in which the occupancy rate of the object detecting capacity occupied by the first photographing mechanism is higher than that by the second photographing mechanism when the motion of an occupant of the driver seat is larger than that of an occupant of the front passenger seat, while the control mechanism sets a second setting mode in which the occupancy rate of the object detecting capacity occupied by the second photographing mechanism is higher than that by the first photographing mechanism when the motion of an occupant of the front passenger seat is larger than that of an occupant of the driver seat.

5. The object detecting system as claimed in claim 1, wherein the first photographing mechanism and the second photographing mechanism each comprise a 3-D camera capable of detecting a three-dimensional profile of an object.

6. The object detecting system as claimed in claim 1, wherein a housing section for accommodating the first photographing mechanism and a housing section for accommodating the second photographing mechanism are composed of a single casing.

7. The object detecting system as claimed in claim 6, wherein the object detecting system is structured as a single unit in which the control mechanism and the electrical power mechanism are also accommodated in the single casing accommodating the first photographing mechanism and the second photographing mechanism.

8. The object detecting system as claimed in claim 7, wherein the single unit is mounted to an area around a side mirror or an area around an inner rearview mirror among respective components of the vehicle.

9. An actuating device comprising:
an object detecting system;
a subject to be actuated; and
an actuation control mechanism to control the actuation of the subject to be actuated based on information detected by the control mechanism of the object detecting system, wherein the object detecting system includes:
a first photographing mechanism for photographing an object in a first area, and a second photographing mechanism for photographing an object in a second area different from the first area, the first area being one of an area inside or outside the vehicle, and the second area being an area inside or outside the vehicle;

a control mechanism to detect information about the objects based on images of the objects taken by the respective first and second photographing mechanisms; and an electrical power mechanism which is disposed between a vehicle battery and the respective photographing mechanisms to supply electrical power from the vehicle battery to each photographing mechanism, wherein at least one of the control mechanism and the electrical power mechanism is shared by the first photographing mechanism and the second photographing mechanism, wherein the control mechanism is shared by the first photographing mechanism and the second photographing mechanism, and the control mechanism varies the occupancy rates of object detecting capacity by the respective photographing mechanisms based on at least one of information about the detected object(s) and information about the vehicle.

10. The actuating device as claimed in claim 9, wherein the electrical power mechanism is shared by the first photographing mechanism and the second photographing mechanism of which timings of using a maximum current are different from each other, and the timing of supply of the maximum current supplied from the electrical power mechanism to the first photographing mechanism is different from the timing of supply of the maximum current supplied from the electrical power mechanism to the second photographing mechanism.

11. The actuating device as claimed in claim 9, wherein the first photographing mechanism forms a viewing field toward an area inside the vehicle as the first area and the second photographing mechanism forms a viewing field toward an area outside the vehicle as the second area, and wherein the control mechanism sets a first setting mode in which the occupancy rate of the object detecting capacity occupied by the first photographing mechanism is higher than that by the second photographing mechanism when the vehicle is stopped, while the control mechanism sets a second setting mode in which the occupancy rate by the second photographing mechanism is higher than that in the first setting mode when the vehicle is running.

12. The actuating device as claimed in claim 9, wherein the first photographing mechanism forms a viewing field toward an area including a driver seat inside the vehicle as the first area and the second photographing mechanism forms a viewing field toward an area including a front passenger seat inside the vehicle as the second area, and wherein the control mechanism sets a first setting mode in which the occupancy rate of the object detecting capacity occupied by the first photographing mechanism is higher than that by the second photographing mechanism when the motion of an occupant of the driver seat is larger than that of an occupant of the front passenger seat, while the control mechanism sets a second setting mode in which the occupancy rate of the object detecting capacity occupied by the second photographing mechanism is higher than that by the first photographing mechanism when the motion of an occupant of the front passenger seat is larger than that of an occupant of the driver seat.

13. The actuating device as claimed in claim 9, wherein the first photographing mechanism and the second photographing mechanism each comprise a 3-D camera capable of detecting a three-dimensional profile of an object.

14. The actuating device as claimed in claim 9, wherein a housing section for accommodating the first photographing mechanism and a housing section for accommodating the second photographing mechanism are composed of a single casing.

15. The actuating device as claimed in claim 14, wherein the object detecting system is structured as a single unit in which the control mechanism and the electrical power mechanism are also accommodated in the single casing accommodating the first photographing mechanism and the second photographing mechanism.

16. The actuating device as claimed in claim 15, wherein the single unit is mounted to an area around a side mirror or an area around an inner rearview mirror among respective components of the vehicle.

17. A vehicle, comprising:
an engine/running system;
an electrical system;
an actuation control device to actuate the engine/running system and the electrical system;
a vehicle battery; and
an object detecting mechanism for detecting information about a plurality of objects in areas inside and outside a vehicle, wherein the object detecting mechanism comprises an object detecting system that includes:
a first camera for photographing an object in a first area, and a second camera for photographing an object in a second area different from the first area, the first area being one of an area inside or outside the vehicle, and the second area being an area inside or outside the vehicle;
a control mechanism to detect information about the objects based on images of the objects taken by the respective first and second cameras; and
an electrical power mechanism which is disposed between the vehicle battery and the respective cameras to supply electrical power from the vehicle battery to each camera,
wherein at least one of the control mechanism and the electrical power mechanism is shared by the first camera and the second camera,
wherein the control mechanism is shared by the first camera and the second camera, and the control mechanism varies the occupancy rates of object detecting capacity by the respective cameras based on at least one of information about the detected object(s) and information about the vehicle.

18. The vehicle as claimed in claim 17, wherein the electrical power mechanism is shared by the first camera and the second camera of which timings of using a maximum current are different from each other, and the timing of supply of the maximum current supplied from the electrical power mechanism to the first camera is different from the timing of supply of the maximum current supplied from the electrical power mechanism to the second camera.

19. The vehicle as claimed in claim 17, wherein the first camera forms a viewing field toward an area inside the vehicle as the first area and the second camera forms a viewing field toward an area outside the vehicle as the second area, and wherein the control mechanism sets a first setting mode in which the occupancy rate of the object detecting capacity occupied by the first camera is higher than that by the second camera when the vehicle is stopped, while the control mechanism sets a second setting mode in which the occupancy rate by the second camera is higher than that in the first setting mode when the vehicle is running.

20. The vehicle as claimed in claim 17, wherein the first camera forms a viewing field toward an area including a driver seat inside the vehicle as the first area and the second camera forms a viewing field toward an area including a front passenger seat inside the vehicle as the second area, and wherein the control mechanism sets a first setting mode in which the occupancy rate of the object detecting capacity occupied by the first camera is higher than that by the second camera when the motion of an occupant of the driver seat is larger than that of an occupant of the front passenger seat, while the control mechanism sets a second setting mode in which the occupancy rate of the object detecting capacity occupied by the second camera is higher than that by the first camera when the motion of an occupant of the front passenger seat is larger than that of an occupant of the driver seat.

21. The vehicle as claimed in claim 17, wherein the first camera and the second camera each comprise a 3-D camera capable of detecting a three-dimensional profile of an object.

22. The vehicle as claimed in claim 17, wherein a housing section for accommodating the first camera and a housing section for accommodating the second camera are composed of a single casing.

23. The vehicle as claimed in claim 22, wherein the object detecting system is structured as a single unit in which the control mechanism and the electrical power mechanism are also accommodated in the single casing accommodating the first camera and the second camera.

24. The vehicle as claimed in claim 23, wherein the single unit is mounted to an area around a side mirror or an area around an inner rearview mirror among respective components of the vehicle.

* * * * *